2,886,460
Patented May 12, 1959

2,886,460
ORGANOPHILIC AND HYDROPHILIC COMPOSITION

Guy B. Alexander and Ralph K. Iler, Wilmington, Del., assignors to E. I. du Pont de Nemours and Company, Wilmington, Del., a corporation of Delaware No Drawing. Application September 14, 1954
Serial No. 456,072

9 Claims. (Cl. 106—308)

This invention relates to novel compositions comprising an inorganic solid having a chemically combined surface coating of organosilyl groups, the proportion of organosilyl groups in relation to the surface area being such that the surface is both organophilic and hydrophilic, and further relates to processes for producing such compositions in which contact is effected between an aqueous dispersion of an inorganic solid having a hydroxylated surface and a water-soluble organosilicolate, at a pH in the range of 7.0 to 10.7.

Various materials have heretofore been treated with such organosilanes as dimethyldichlorosilane vapor, the objective being to make the materials water-repellant—that is, hydrophobic. The processes employed have been adapted to the purpose of giving a coating of maximum hydrophobicity and have generally been not susceptible to control so as to give any other kind of coating. For instance, such processes have employed as the treating agent materials which are decomposed by water, and it has not been thought feasible to operate in aqueous dispersions.

On the other hand, many materials to which it is desired to apply hydrophobic coatings are prepared in the form of aqueous dispersions and it has been necessary to convert such dispersions to anhydrous systems in order to employ the conventional treating agents of the organosilicol type. Such conversion to anhydrous systems is not only expensive but also the drying procedures employed sometimes result in a change in the physical structure of the inorganic solids. Silica gels, for instance, when dried from aqueous dispersion, are subjected to surface forces which cause them to shrink, and the gel structure is thereby permanently altered. It is therefore quite difficult to render such materials anhydrous in preparation for the hydrophobing treatment.

Now, according to the present invention it has been found that aqueous dispersions of inorganic solids having hydroxylated surfaces, such as dispersions of silica gel, can be treated with water-soluble organosilicolates at a pH in the range of 7.0 to 10.7 and thereby an organophilic coating can be chemically attached to the inorganic solids even in the presence of the water, the solids also remaining hydrophilic. The organophilic products can be filtered off or dried directly from the dispersion, obviating the necessity for complicated methods of transfer to anhydrous systems.

Even for materials where it is undesirable or impossible to recover the product by direct means such as filtration or drying, the organophilic coating facilitates economical recovery in dry form. Thus, for materials of high surface area such as silica gels, where direct drying results in shrinkage or other alteration of the structure, the organophilic coating permits a direct transfer of the solid into a partially water-immiscible organic liquid. By this method, for instance, the organic liquid can be shaken with the aqueous dispersion of the organophilized solid, whereupon the solid goes into the organic phase merely by mixing the two phases together and allowing them to separate.

The inorganic solids which are treated in a process of this invention have hydroxylated surfaces. This means that they have upon their surfaces hydroxyl groups which are capable of reacting chemically with the organosilicolate treating agents. The more surface which is presented for reaction by the solid, the more effective the treatment will be, assuming that the hydroxyl groups are distributed over the surface substantially uniformly. On the other hand, colloidal dispersions of solids in liquids, while they may contain the solid in a state having large surface area, are not solids within the meaning of that term as herein used.

The physical form of the solid is therefore important in the processes of the present invention. The solid is preferably in such a state of subdivision that it can be suspended in water but is not in the colloidal state of subdivision and the suspension is not a colloidal sol. Solids which are porous and have a high internal surface area available for reaction are suitable and indeed, since dehydration of such materials is an especially difficult problem the present invention may be applied to the drying of them with especial advantage. Such materials are not necessarily finely divided since their high surface area is not dependent upon a fine degree of subdivision. On the other hand, finely divided solids can also be treated with especial advantage. According to one specific embodiment of the invention there is used with particular advantage solids which have at least one dimension which is less than about 5 microns.

Suitable materials can be long fibers or the comparatively short fibers which may also be termed rods. These may or may not be crystalline. Generally it may be said of the fibers that they are at least 10 times as long as their diameter. The solids may also assume the shape of plates or plate-like particles. Where all three of the dimensions are equal or nearly equal the particles assume the shape of spheres.

The solids can have a specific surface area of about from 1 to 900 square meters per gram (m.$^2$/g.). For solids which are not porous this means that the particle size will not be larger than about a few microns. For spheres having a specific surface area of about 1 m.$^2$/g. the particle diameter will be of the order of 1 to 5 microns depending upon the material of which the spheres are made. The preferred solids have a surface area in the range of 50 to 600 m.$^2$/g., with areas of from 100 to 400 m.$^2$/g. being especially preferred.

The solids can also be powders which are made up of aggregates of particles in the above-mentioned size ranges. This will include gels and other porous bodies.

Since the inorganic solids are to be treated in aqueous dispersion it will be obvious that they must not be water-soluble.

As already mentioned, it is important that the solid material be receptive to the attachment of the organosilicolate. Alternatively, the solid can be made receptive by a suitable treatment as will hereinafter be described.

In considering the chemical character of the solid it will be apparent that the entire solid need not be homogeneous in composition. It is only important that the surface of the solid particles be reactive and hence the interior of the solid particles may have any composition.

Among the solid materials which are preferably treated according to the present invention are substances which are covered with at least a monolayer of silica, a silicate or an oxide of a metal which forms an insoluble silicate at a pH between 7 and 11. Metals which fit this description are copper, silver, barium, magnesium, beryllium, calcium, strontium, zinc, cadmium, aluminum, titanium, zirconium, tin, lead, trivalent chromium, manganese, iron, cobalt, and nickel. Combinations of oxides of two or more of these metals may also be present.

It will be understood that when an oxide of the metal is mentioned, the oxide may be hydrated. While by visual observation a metal may appear to be free of oxide coating, nevertheless, upon proper examination it will be found that any metal in contact with atmosphere and moisture very quickly develops an extremely thin oxide or hydroxide coating.

Typical, then of the solids of the types which have just been discussed are the following: metal oxides, and hydrated oxides such as aluminum oxide, chromium oxide, iron oxide, nickel hydroxide, titanium dioxide, zirconium oxide, zinc oxide, and cobalt oxide; metal silicates such as magnesium, aluminum, zinc, lead, chromium, copper, iron, cobalt, and nickel silicates; natural metal silicates such as the various varieties of clay including kaolin, bentonite, attapulgite, and halloysite; natural fibrous metal silicates such as chrysotile asbestos, amosite, crocidolite, and wallastonite; plate-like mineral silicates including various varieties of mica such as exfoliated vermiculite, muscovite, phlogophite, biotite, talc, and antigorite; and finely divided synthetic metal silicate products such as glass fibers and rockwool.

It will be understood that the proportion of surface hydroxyl groups in such materials as the naturally occurring metal silicates just mentioned may be relatively small. This proportion can be increased by treating the silicate with an acid to dissolve out metal ions on the surface, leaving surface silanol groups (—SiOH) on the surface. Alternatively, a layer of hydroxylated material such as silica may be deposited upon the surface of the particles, so that for practical purposes they present a surface of silanol groups.

Processes of the present invention in which the solid treated is amorphous silica are particularly advantageous. Amorphous silica is often in the form of porous aggregates of very small ultimate particles and when such aggregates are dried from aqueous dispersions the porous structure collapses. If the surface of the amorphous silica has been treated with an organosilicolate in accordance with the present invention this tendency to collapse is minimized. The pores persent exposed surfaces in the interior of the lump or particle of amorphous silica which are connected to the exterior so that liquids and gases can penetrate the pores and reach the exposed surfaces of the pore walls. Thus, the solid amorphous silica forms a three-dimensional network or webwork through which the pores or voids or interstices extend as a labyrinth of passages or open spaces. Especially preferred for treatment according to the present invention are porous inorganic siliceous solids having average pore diameters of at least four millimicrons.

Representative of porous amorphous silicas which can be treated are coherent aggregates of extremely small, non-porous, substantially-spherical, ultimate, amorphous, dried silica units. A coherent aggregate is one in which the ultimate tiny units are so firmly attached to each other that they cannot be separated by suspension in fluid medium. Such an aggregate can be pulverized by grinding and attrition. When these aggregates are made up of ultimate units joined in a fairly open three-dimensional network, they are pulverulent and can be easily disintegrated to fine powders having particle sizes in the range of 1 to 10 microns. These powdery particles retain the porous or network structure. The ultimate units are chemically bound together by siloxane bonds (Si—O—Si) so that the coherent aggregates can properly be thought of as chemical compounds of high molecular weight.

Coherent aggregates of amorphous silica can also be considered to be gel structures. The term "coherent aggregate" includes conventional silica gel. However, it also includes materials so different from conventional silica gel that to call them gels would be misleading. In conventional silica gels the ultimate spherical units are always below 10 and usually below 5 millimicrons in diameter, and are so closely packed that the pores or interstices are very tiny. For many purposes, particles having ultimate units of 10 to 100 millimicrons' average diameter, or ultimate units below 10 millimicrons' diameter joined in very open networks (large pore size), are more advantageous than conventional silica gels, and are preferred.

The inorganic siliceous solids used in the preferred processes of this invention have large surface areas in relation to their mass. The relationship of surface area to mass is called the "specific surface area" and is expressed as square meters per gram ($m.^2/g.$). As used in this application, specific surface area is expressed numerically in $m.^2/g.$ as determinable by a method such as the nitrogen adsorption method described in Iler Patent 2,657,149 at column 6, lines 25 to 44. Solids which are to be treated according to this invention have a specific surface area of 1 to 900 $m.^2/g.$ For inorganic siliceous solids subdivided into essentially spherical nonporous particles, this corresponds to a maximum particle diameter of about 2 to 3 microns. The specific surface area becomes quite significant at about 25 $m.^2/g.$ This corresponds to a particle diameter of about 100 millimicrons for essentially spherical non-porous particles.

Pore volumes of the siliceous solids may be determined from the nitrogen adsorption isotherms, as described by Holmes and Emmett in Journal of Physical and Colloid Chemistry, 51, 1262 (1947). The pore diameter values are obtained by geometric calculation from an assumed cylindrical pore structure.

If the coherent aggregates of amorphous silica used in preferred processes of this invention are made up of ultimate units about 5 to 100 millimicrons in average diameter, pore size problems are minimized. Finely divided silica powders of this type, consisting of ultimate units 15 to 100 millimicrons in diameter linked together to form supercolloidal coherent aggregates, offer particular advantages because they are especially easy to filter and process in the later steps of recover; on the other hand, solids of this type having ultimate units 5 to 15 millimicrons in diameter are very difficult to prepare as dispersable powders for use in organic systems such as elastomers and plastics. By treatment and subsequent drying from an organic liquid the dispersibility is remarkably improved.

When the specific surface area exceeds about 200 $m.^2/g.$, the surface of the material contains a relatively large proportion of the total number of silicon atoms present. In the case of a precipitated silica having a surface area of 200 $m.^2/g.$, more than 10 percent of all the silicon atoms are on the surface of the extremely small, dense, ultimate units of silica in the aggregate. With such substrates very marked physical effects are brought about by surface modification, according to a process of this invention. For example, in the thickening of oils and organic coating compositions with fine silica having a specific surface area of over 200 $m.^2/g.$, the improvement in properties brought about by surface treatment according to the present invention becomes very important.

The external walls of dense, extremely finely pulverized, glassy silica gel may also be treated by processes of this invention. Such gels have a specific surface area as high as 900 $m.^2/g.$, mostly as the walls of tiny pores less than 4 millimicrons in average diameter. However, in such compact structures, which cannot readily be further comminuted, a part of the organosiliconate is trapped within the tiny pores and does not contribute to the organophilic character of the exposed surface. Nevertheless, the organosilicolate groups on the external walls of such particles renders the surface organophilic.

Porous, amorphous silicas for treatment with organosilicolates according to this invention can be made by coalescing sols of built-up particles made by processes of Bechtold and Snyder U.S. Patent 2,574,902. Alternatively, the amorphous silica can be prepared by neutralizing sodium silicate with an acid as described in Alexander et al. U.S. Patent 2,601,235. Products suitable for treatment according to the present invention can also be prepared by any of the processes described in an application by Alexander, Iler and Wolter, Serial No. 244,722, filed August 31, 1951, now Patent No. 2,731,326. Briefly, these materials can be prepared by mixing an aqueous dispersion of active silica with coalesced aggregates consisting of a plurality of amorphous, dense, ultimate silica units and heating the mixture above 60° C. at a pH of 8 to 11, whereby the active silica accretes to the coalesced aggregates. The dispersion of active silica can conveniently be prepared by adding sodium silicate and acid simultaneously to an aqueous dispersion of aggregates. The aggregates may be prepared by adding carbon dioxide gas to a sodium silicate solution heated to a temperature of 95° C., the addition being completed over a period of about 40 minutes. The $CO_2$:$Na_2O$ mol ratio should be about 1.2 and the pH of the sol around 10. The sol thus prepared can serve as a heel to which carbon dioxide gas and sodium silicate solution are added simultaneously with agitation and a temperature of about 95° C. The quantity of $SiO_2$ in the feed solution should be about four parts for each part of $SiO_2$ originally present in the heel. The silica nuclei which are built up by this process will serve as nuclei for the build-up of the coalesced aggregates using active silica as above described. Aggregates prepared in various manners also may be used, as long as they are in finely divided, particulate form.

An especially practical adaptation of the procedure just described consists in reinforcing the structure of precipitated silica in particulate form by accreting active silica thereto. Such products may more readily be dried without collapse of the gel structure to give particles of very low bulk density. Both these products, and the corresponding products in which the original ultimate units in the aggregates before reinforcement were larger than those in a gel, can advantageously be dried by adding an organic liquid such as tertiary or normal butyl alcohol and azeotropically distilling out the water. The details of such a process are described in the above-mentioned aplication Serial No. 244,722.

Another type of substrate suitable for treatment by a process of this invention consists of particles having an external coating or layer of amorphous silica upon an internal core of another material. Such products may be made by depositing active silica upon nuclei of the heterogeneous substance by treating sodium silicate with an acid in the presence of the core materials, as described in United States patent application Serial No. 252,965, filed October 24, 1951, by Ralph K. Iler, and now abandoned. Colloidal clays, glass fibers and other metal silicates, titania pigments, and the like may serve as cores, the ultimate, coated particles being of supercolloidal size.

Another suitable form of a hydrated amorphous silica powder which may be used is one consisting of supercolloidal aggregates of ultimate units of from 10 to 50 millimicrons in diameter, described in Chemical Engineering, 54, 177 (1947), produced by the Linde Air Products Company. It has a specific surface area of about 240 m.$^2$/g. and a bulk density of about 0.064 gram per cc. at 3 p.s.i.g.

A further form of amorphous silica which may be used is an aerogel having a specific surface area of about 160 m.$^2$/g. as determined by nitrogen adsorption, and a bulk density of about 0.087 gram per cc. at 3 p.s.i.g., and marketed as "Santocel C" by the Monsanto Chemical Co.

Still another form of amorphous silica substrate is a powder consisting of supercolloidal aggregates of ultimate units having an average diameter of about 25 millimicrons, a surface area of about 100 m.$^2$/g., and containing a small amount of calcium (1 to 2 percent by weight), marketed by the Columbia Chemicals Division of the Pittsburgh Plate Glass Company as "Hi-Sil."

Yet another form of amorphous silica powder substrate consists of supercolloidal aggregates having a surface area of about 210 m.$^2$/g. and obtained from Germany under trade name of "K–3."

Irrespective of its chemical or physical nature, the inorganic solid having a hydroxylated surface is treated according to the present invention in the form of an aqueous dispersion. Hence, the various inorganic solids above described need not be dried out before treatment but can be allowed to remain in aqueous dispersions if they are so prepared.

As the treating agent in a process of this invention there is employed an organosilicolate having the formula

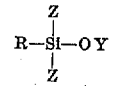

where R is a hydrocarbon group, Y is hydrogen or a monovalent cation of a strong base such as sodium, potassium or tetramethylammonium hydroxide, and Z is R or OY. Also, the silicolate can be formed in situ by adding an alkoxysilane of the formula

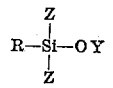

where Y is an alkyl group, especially a short chain group such as methyl or ethyl, and hydrolyzing off the alkoxy group to give the corresponding hydrogen silicolate. The organosilicolate is soluble in water by reason of containing the polar —OY group. The terms "organosiliocolate," "organosilanolate," and "organosiliconate" are often used interchangeably in the art, and it will be understood that any of the materials so referred to can be employed, provided it is water soluble.

The silicolates may be made from the corresponding silanols or their siloxane condensation products by dissolving them in a solution of alkali. In other words, silanols may be made from compounds of the type RSiX$_3$ and RR'SiX$_2$ where R is a hydrocarbon radical, and R' is the same or a different hydrocarbon radical, and X is an OH, halogen, OR, ONa or other radical which upon hydrolysis will produce an OH group attached to the silicon atom. Compounds of the type RR'R"SiOH can be prepared in situ in the reaction medium by hydrolysis of the corresponding RR'R" alkoxysilane.

The hydrocarbon radicals can be alkyl, aryl, aralkyl, alkaryl, or alkylene-substituted aryl, and can be the same or different from each other. Regardless of whether there are one, two or three hydrocarbon radicals in the substituted silanol, the best results are obtained when the total number of carbon atoms in the hydrocarbon group attached to a single silicon atom does not exceed 20, and accordingly, this class is preferred. Short-chain alkyl and alkylene radicals having a chain range from 1 through 8 carbon atoms give very stable products and are preferred with the limitation above noted—namely, that the total number of carbon atoms in the hydrocarbon groups attached to a single silicon atom does not exceed 20. It is still more specifically preferred that the number not exceed 7.

Typical compounds of the type just described are methyl silicon trichloride, dimethyl silicon dichloride, ethyl silicon trichloride, diethyl silicon dichloride, vinyl silicon trichloride, phenyl silane triol, diphenyl silane diol, benzyl silicon trichloride, dibenzyl silicon dichloride, butyl trimethoxy silane, dibutyl diethoxy silane, vinyl methyl dichloro silane. Additional materials containing longer hydrocarbon chains attached to silicon are cetyl silicon trichloride, didodecyl silicon dichloride, and octyl silicon trichloride. It will also be understood that the foregoing specific compounds instead of being in the form of the chloride aforementioned may be in the form of the bromide or iodide and, less preferred, the fluoride. In the case of the alkoxy derivatives it is preferred to use the methoxy or ethoxy because of the ease of hydrolysis of the derivatives in forming the silanols. It is to be noted particularly of the longer chain derivatives that some of the products are difficultly soluble in water. They can be added to the aqueous system in a volatile, water-miscible solvent. The solvent promotes distribution of the reagent throughout the system after which the mutual solvent can be removed if desired before going further with the process.

The organophilizing agents used in a process of this invention consist of water-soluble derivatives which may be prepared from suitable silanols or siloxane condensation products derived from the above types or from organosilicon intermediates, by dissolving them in an aqueous solution of a strong alkali. Solubilization is often promoted by the addition of a minor proportion of alcohol to the aqueous alkali. Such alkaline solutions may be used as, for example, 1 normal sodium hydroxide, or potassium hydroxide. Especially interesting are products prepared using strong organic bases, such as the quaternary ammonium bases which contain not more than 2 to 3 carbon atoms per alkyl group attached to nitrogen. The preferred compound of this group is tetramethyl ammonium hydroxide. Since it is the object to prepare salts which are highly soluble in water, those quaternary bases in which solubilizing groups are also present in the radicals attached to nitrogen are preferred. Such bases as tetraethanol ammonium hydroxide, for example, provide a highly soluble material and provide highly soluble silicolate salts. Other suitable quaternary ammonium bases are ethyl trimethyl ammonium hydroxide and vinyl trimethyl ammonium hydroxide. Since the solubilizing action of these compounds depends upon the presence of hydroxyl ions, they will be used in the form of their free bases which may be prepared by reacting the salts of these organic bases with silver hydroxide or sodium hydroxide, for example.

Of all the organosilicolates, sodium methyl silicolate and sodium vinyl silicolate are especially preferred. A product called "sodium methyl siliconate" is available under the designation "SC-50" from the General Electric Company, the product having a total solids content of 31.2 percent, a basic solids as $Na_2O$ of 9.5 percent, a silicon solids as $CH_3SiO_{1.5}$ of 20 percent in water as a solvent, the material having a viscosity of 100° F. of 5 to 7 centistokes and a pH of approximately 13.

An especially preferred treating agent, hydrogen methyl siliconate, i.e., methyl siliconic acid, can be prepared by diluting sodium methyl siliconate with water to a silicone solids content of 1 to 2 percent, and then passing this diluted solution through an ion exchange column to replace the sodium ion with hydrogen ion. The resulting siliconic acid solution should be used immediately after preparation.

Having selected a suitable inorganic solid with a hydroxylated surface and the desired organosilicolate as above described, the solid is organophilized in aqueous dispersion by effecting contact with the organosilicolate at a pH in the range of 7.0 to 10.7. The temperature preferably is above 60° C., and more particularly can be in the range from 50 to 100° C. or even up to 140° C. if pressure is used. An especially preferred amorphous silica to use is one having a hydroxylated surface area of from 100 to 400 m.$^2$/g. The treatment usually is accomplished in 10 to 15 minutes at 80° C.

If the inorganic solid being treated is an acidic material or an alkali acceptor it may be sufficient merely to add the organosilicolate, the pH being adjusted by the acidic material to remain in the desired range. However, ordinarily to maintain the pH in the desired range it is necessary to add an acid such as sulfuric or hydrochloric acid simultaneously with the organosilicolate. This can be done, for instance, while following the pH by withdrawing samples, cooling them, and observing the pH with a Beckman Model G pH meter. When using methyl siliconic acid (prepared from sodium methyl siliconate as above described), no additional acid is required, and as a general rule, one can add the siliconic acid directly to an aqueous slurry of the inorganic product which is to be treated.

Ordinarily it is most convenient to add the organosilicolate and, if required, an acid, simultaneously to an aqueous dispersion of the inorganic solid being organophilized. Under some circumstances this order may be reversed, however, or the silicolate, the inorganic solid, and the acid may be added simultaneously to a heel of reacted material. It is preferred to provide agitation sufficient to prevent any large excess local concentration of organosilicolate during the treating process.

By maintaining the pH during treatment in the range 7–10.7, preferably 9 to 10, the temperature above 50° C., preferably above 80° C., the local concentration of excess organosilyl reagent to a minimum of vigorous mixing, and the soluble salt concentration, e.g., $Na_2SO_4$ from reaction of sodium methyl siliconate with $H_2SO_4$, to less than 0.1 N, one can succeed in applying a coating of organosilyl as a partial monomolecular layer, rendering the treated product organophilic. If reaction conditions are not maintained within the given limits, the organosilyl reagent tends to form a siliconic acid gel. This results in an inefficient use of the treating agent and gives a heterogeneous product. Such products only may be inferior because of decreased pore volume (gel in pores), decreased surface area (multilayer coating and/or gel in pores) and decreased dispersibility, i.e., not being readily disintegrated to colloidal fragments by mechanical shearing action in a fluid or plastic medium.

The inorganic solid, after treatment by a process of this invention, has a pronounced organophilic surface character. It can be dried directly from water if desired, or it can be filtered off and dried. Alternatively, the aqueous dispersion of the product can be mixed with an organic liquid which is only partially soluble in water, such as normal butanol or benzene, whereupon the organophilized product, by reason of its organophilic surface character, will wet into the organic liquid in preference to the water and may be separated as a dispersion in the organic phase. This method of product recovery is particularly advantageous where the solid treated is a porous, amorphous silica structure such as a silica gel or a silica precipitate of the character more particularly described above. The advantage of this particular method of product recovery is that the gel structure does not collapse nor do the silica particles coalesce during the drying procedure.

The products of this invention are surface-organosilyl-modified, finely divided, organophilic, hydrophilic inorganic materials. The products have a surface area in the range of 1 to 900 m.$^2$/g., and the preferred products, of 200 to 600 m.$^2$/g.

That the products are both organophilic and hydrophilic can be determined as follows: A sample of the product, either as a pulverized powder or as an aqueous filter cake, is dropped into a test tube approximately ⅓ filled with water. On shaking, the product will readily wet into the water. An equal volume of n-butanol is now added to the test tube and the mixture is shaken vigorously six or eight times. On standing, the mixture will separate into two phases, a water-rich and a butanol-rich phase. The products of this invention, being organophilic, will transfer and appear in the n-butanol-rich phase.

Products of this invention have a measurable dye adsorption, corresponding to from 5 to 33% of the surface area as measured by nitrogen adsorption. Thus, a product having a surface area as measured by nitrogen adsorption of 300 m.$^2$/g. will have a hydroxylated surface area as measured by dye adsorption of from 15 to 100 m.$^2$/g. Dye adsorption can be measured according to the method described in U.S. 2,657,149, column 19, line 54, to column 20, line 15.

The products of this invention have attached to their surface from ⅓ to ⅝ of the number of organosilyl groups necessary for complete coating. About 6 monomethylsilyl, 3.5 dimethylsilyl, 3.8 monoethylsilyl, 3.8 vinylsilyl, or 3.2 monobutyl silyl groups per square millimicron of substrate ordinarily give a complete coating. Thus, for example, a product of this invention would contain from 2 to 5 monomethylsilyl groups per square millimicron of surface area. This will render the product organophilic and hydrophilic. When organosilyl groups are applied according to the process of this invention, the coating forms essentially a partial monomolecular layer coverage. When an effort is made to apply more coating, either a multi-layer coverage is produced or a codeposition of an organosiliconic acid gel in and around the inorganic solid occurs, thus decreasing the pore volume, dispersibility and general utility of the product. By following the processes of this invention, and by applying a coating corresponding to only a partial mono layer coverage, these difficulties can be avoided.

The organosilyl group which has been used in a process of this invention can be readily identified, as for example by treating the product with hydrofluoric acid, separating and identifying, as by boiling point, the organosilyl fluoride so released (see Chem. Rev. 41: 97–149 (1947)).

Percent carbon in the sample can be determined by oxidizing a weighed sample by heating in oxygen, collecting and weighing the liberated carbon dioxide. From the carbon content and the nitrogen surface area of a given product, one can calculate the number of organosilyl groups originally present per square millimicron.

One of the most preferred products is obtained by coating amorphous silica substrates. Such products have, in addition to the above, the following characteristics: (a) an open-packed reticulated structure; i.e., a linseed oil absorption in milliliters of oil per 100 g. of product, of from 1 to 3 times the specific surface area in m.$^2$/g. and (b) a pH in the range of 5.8. The pH can be measured by slurrying 2 g. of the product in 40 ml. $H_2O$ stirring 5 minutes and measuring the pH with a Beckman Model G pH meter.

The invention will be better understood by reference to the following illustrative examples:

Example 1

A 15 percent silica sol of about 7 m$\mu$ particle diameter was prepared from dilute sodium silicate by deionization and evaporation at a pH of 8.5 to 9. This 15 percent sol was deionized with respect to both cations and anions, the pH was adjusted to 5.0 with 1 N sodium hydroxide, and the sol was then heated in a steam bath to produce gellation. In order to set the gel firmly, it was heated further in the steam bath for 1 hour after gelling.

To 26.7 parts of this gel was added 56.3 parts of water and the mixture was thoroughly blended in a Waring Blendor. The mixture was then heated to 80° C. and was thoroughly agitated by means of a mechanical stirrer. Nineteen parts of a solution of sodium methyl silicolate containing 0.75 part $CH_3SiO_{1.5}$ and 0.36 part $Na_2O$ was added simultaneously with 1 $NH_2SO_4$ at rates such that the pH was maintained at 8.8 to 9.2 and the total time of addition was 5 minutes. Agitation was continued for 1 minute, after which the gel was filtered off and washed free of sulfate. The filter cake was then dried in an oven at 130 to 140° C.

The product was analyzed and found to contain 95.05 percent $SiO_2$ and 2.59 percent C. Based on the assumption that the specific surface of the gel is 420 m.$^2$/g., the number of methyl silyl groups added per square millimicron of surface represent a reaction efficiency of about 93 percent of theoretical, based on the silicolate employed.

The oven-dried product obtained was readily wet by water but, on addition of n-butanol, the silica transferred itself to the butanol phase.

Example 2

A reaction was carried out exactly as described in Example 1, except that a temperature of 60° C. instead of 80° C. was employed during the simultaneous addition of silicolate and acid.

The oven-dried product was found to contain 95.55 percent $SiO_2$ and 2.26 percent C. Based on the assumption that the specific surface area of the gel is 420 m.$^2$/g., the number of methyl silyl groups added per square millimicrons of surface was 3.22. The 3.22 groups added per square millimicron of surface represents a reaction efficiency of about 80 percent based on the silicolate employed.

The oven-dried product was readily wet by water, but on addition of normal butanol, the product passed into the butanol phase.

Example 3

This example illustrates the use of methyl siliconic acid as the organosilicolate.

To make a substrate for treatment according to the invention a reinforced silica gel was prepared as follows: A colloidal silica sol, containing about 17% by weight of $SiO_2$ and having an $SiO_2$:$Na_2O$ mole ratio of about 100, and in which the particles were of such a size that they had a surface area of about 420 m.$^2$/g., was passed through an ion exchange column to remove all of the ions. This column consisted of a mixed bed of anion and cation exchange resins in regenerated form. The deionized sol was diluted to 15% by weight of $SiO_2$, and the pH was adjusted to 5 with aqueous ammonia. The silica sol was then added to an agitated body of n-butanol containing sufficient water to saturate the n-butanol at about 80° C. The ratio of the n-butanol to silica was 5.0 by weight.

The mixture was heated with continued agitation to 85° C., and kept there until gelation of the silica in the dispersed phase occurred. The temperature and agitation were maintained for about 20 min. after gelation occurred.

The silica:ammonia weight ratio was then adjusted to 100, by the addition of ammonia, thereby raising the pH in the acqueous phase to between 9 and 10. The mixture was maintained at 85° C. for a period of about 6 hours, with mild agitation. Thus a reinforced gel was produced.

To apply a coating of organosilyl groups, the reinforced gel was treated with methyl siliconic acid. This siliconic acid was prepared by passing a solution containing 2% silicone solids ($CH_3SiO_{1.5}$) in the form of sodium monomethyl siliconate through a cation exchange column ("Nalcite" HCR in the hydrogen form) at a rate of 50 ml./min., the column having a diameter of about 1.5". The effluent containing methyl siliconic acid had a pH of about 2.1. This methyl siliconic acid was then added to a slurry of the reinforced gel, above described, after heating the emulsion of gel to about 85° C., 500 ml. of methyl siliconic acid solution being added over a period of 1 hour, at a uniform rate, for each 100 g. of $SiO_2$ in the system. During this addition, the temperature was maintained in the range of 83–87° C.

It was observed that the resulting product separated into two layers. The upper, butanol-rich layer contained all of the silica; the water layer below was essentially clear. The sample was filtered, and the water layer, which had a pH of 9.7, was discarded.

A sample of the filter cake was dried in a vacuum oven at 40° C., and the dried product found to contain 1.8% carbon, and had a pH of 5.8, a surface area of 310 m.$^2$/g. as measured by nitrogen adsorption and 95 m.$^2$/g. as measured by dye adsorption.

Example 4

This example is similar to Example 3 except twice the quantity of methyl siliconic acid was used; i.e., 5 methyl silyl groups were added per square millimicron of silica substrate surface area. A 95% reaction between silica substrate and organosilyl reagent was obtained. The dried product had the following analysis:

|   | M.²/g. |
|---|---|
| Surface area by nitrogen adsorption | 324 |
| Surface area by dye adsorption | 32 | pH 6.3, and percent carbon 3.03.

Example 5

This example shows the treatment of a TiO$_2$ product with methyl siliconic acid.

To 400 g. of pigment grade TiO$_2$ (15 m.²/g. surface area anatase) was added 1.5 liters of H$_2$O. The pH of this slurry was 7.8. To this, 550 ml. of a dilute solution of methyl siliconic acid (2% CH$_3$SiO$_{1.5}$) was added over an hour, while maintaining a temperature of 90° C. The treated solids were recovered by filtration, the pH of the filter cake was adjusted to 5.0 with dilute H$_2$SO$_4$, and this product was dried in a vacuum oven at 100° C. The dry powder was hydrophilic and organophilic.

Example 6

60 g. of Fe(NO$_3$)$_3$·9H$_2$O was dissolved in 400 ml. H$_2$O. The pH of this solution was slowly raised to 8.0, by adding 3 N NaOH. The precipitated iron oxide was filtered and washed.

The filter cake was slurried in 750 ml. of water and 600 ml. of n-butanol was then added. The mixture was heated to 85° C. and 400 ml. of a solution of methyl siliconic acid (2% CH$_3$SiO$_{1.5}$) was slowly added, whereupon the iron oxide gel was extracted into the n-butanol layer.

Example 7

This example illustrates the coating of a synthetic magnesium silicate with methyl siliconic acid:

A heel was prepared by diluting 126 g. of sodium silicate (SiO$_2$:Na$_2$O=3.25; SiO$_2$=28.6%) to 1.8 liters, and adding thereto, at room temperature over ½ hour, a dilute H$_2$SO$_4$ solution prepared by mixing 15 g. 95.5% H$_2$SO$_4$ and 600 ml. H$_2$O.

The heel was heated to 90° C. and two solutions were added thereto: (a) 126 g. of sodium silicate diluted to 360 ml. with H$_2$O and (b) 20 g. MgCl$_2$·6H$_2$O and 8 g. 36.5% HCl diluted to 360 ml. with water. These solutions were added separately, simultaneously, and at uniform rates over a 1 hour period, with T=90° C. The resulting synthetic magnesium silicate was recovered from the aqueous slurry by filtering and washing.

The filter cake was slurried in water, pH=8.0, heated to 90° C. and 0.9 liters of methyl siliconic acid solution (CH$_3$SiO$_{1.5}$=2%) was added over 1 hour. The resulting product was organophilic and hydrophilic. When dried, the powder had a surface area of 489 m.²/g. and a carbon content (3.10%) equivalent to 3.2 methyl silyl groups per square milimicron of surface area.

Example 8

This example shows the treatment of a natural mineral, talc, with methyl siliconic acid in order to render it organophilic.

A sample of talc, Mg$_3$Si$_4$O$_{10}$(OH)$_2$, was bead milled as a 20% suspension in water for 4 days. (Surface area of product, 36 m.²/g.) The suspension when diluted to 10% had a pH of 9.8. When treated with a solution of methyl siliconic acid, as per Example 7, the talc becomes organophilic and can then be dried to a material useful in face powders.

This application is a continuation-in-part of our application Serial No. 362,693, filed June 18, 1953 now abandoned.

We claim:

1. In a process for organophilizing an inorganic solid having a hydroxylated surface the step comprising mixing, at a pH in the range of 7.0 to 10.7 and a temperature of 60 to 140° C., an inorganic water-insoluble solid, the surface of which is covered with at least a monolayer of a surface hydroxylated material selected from the group consisting of silica, silicates, and oxides of metals which form insoluble silicates at a pH between 7 and 11, the solid being in a form having a surface area of from 1 to 900 m.²/g., as an aqueous dispersion, and a water-soluble organosilicolate having the formula

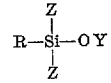

where R is a hydrocarbon group of 1 to 8 carbon atoms, Y is hydrogen or a monovalent cation of a strong base, Z is R or —OY, and the total number of carbon atoms in R and both Z's is not more than 20, whereby chemical reaction between the hydroxylated surface and the organosilicolate is effected, and the proportion of organosilicolate used being sufficient to provide from ⅓ to ⅝ the amount of organosilyl groups needed for monomolecular layer on the silica, whereby a coated silica product which is both organophilic and hydrophilic is produced.

2. A composition consisting essentially of an inorganic, water-insoluble solid core, the surface of which is covered with at least a monolayer of a material selected from the group consisting of silica, silicates, and oxides of metals which form insoluble silicates at a pH between 7 and 11, the solid core having a surface area of from 1 to 900 m.²/g. and a chemically combined surface coating of organosilyl groups, the hydrocarbon groups attached to silicon atoms in said organosilyl groups containing from 1 to 8 carbon atoms and the total number of carbon atoms being not more than 20 and the proportion of organosilyl groups being from ⅓ to ⅝ the amount needed for a monomolecular layer, whereby the surface is both organophilic and hydrophilic.

3. A composition which is both organophilic and hydrophilic, the composition consisting essentially of amorphous silica with a surface area of from 1 to 900 m.²/g. and a chemically combined surface coating of organosilyl groups, the hydrocarbon groups attached to silicon atoms in said organosilyl groups containing from 1 to 8 carbon atoms and the total number of carbon atoms being not more than 20, and the proportion of organosilyl groups in the coating being from ⅓ to ⅝ the amount needed for a monomolecular layer.

4. A composition which is both organophilic and hydrophilic, the composition consisting essentially of amorphous silica with a surface area of from 1 to 900 m.²/g. and a chemically combined surface coating of organosilyl groups, the hydrocarbon groups attached to silicon atoms in said organosilyl groups containing from 1 to 8 carbon atoms and the total number of carbon atoms being not more than 20, and the composition having a hydroxylated surface area, as measured by methyl red dye adsorption, of 5 to 33% of the surface area as measured by nitrogen adsorption, and the proportion of organosilyl groups being from ⅓ to ⅝ the amount needed for a monomolecular layer.

5. A composition which is both organophilic and hydrophilic, the composition consisting essentially of amorphous silica in the form of porous, supercolloidal aggregates of dense ultimate particles, the aggregates having a chemically combined surface coating of organosilyl groups, the hydrocarbon groups attached to silicon atoms in said organosilyl groups containing from 1 to 8 carbon atoms and the total number of carbon atoms being not more than 20, the composition having a hydroxylated surface area, as measured by methyl red dye adsorption, of 5 to 33% of the surface area as measured by nitrogen adsorption, a specific surface area of from 200 to 600 m.²/g., a linseed oil absorption, milliliters per 100 grams of product, of from 1 to 3 times the specific area, and the proportion of organosilyl groups being from ⅓ to ⅚ the amount needed for a monomolecular layer.

6. In a process for organophilizing solid, amorphous silica the step comprising mixing, at a pH in the range of 7.0 to 10.7 and a temperature of 60 to 140° C. an aqueous dispersion of a solid, amorphous silica, in a form having a surface area of from 1 to 900 m.²/g., and a water-soluble organosilicolate having the formula

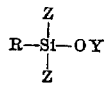

where R is a hydrocarbon group, Y is hydrogen or a monovalent cation of a strong base, and Z is R or —OY, whereby chemical reaction between the organosilicolate and the surface of said silica is effected, and the proportion of organosilicolate used being sufficient to provide from ⅓ to ⅚ the amount of organosilyl groups needed for a monomolecular layer on the silica, whereby a coated silica product which is both organophilic and hydrophilic is produced.

7. In a process for organophilizing solid, amorphous silica the steps comprising making a solution of methyl siliconic acid by passing an aqueous solution of sodium methyl silicolate through a cation exchanger in hydrogen form, and immediately mixing, at a pH in the range of 7.0 to 10.7 and a temperature of 60 to 140° C., the methyl siliconic acid and an aqueous dispersion of a solid amorphous silica in a form having a surface area of 1 to 900 m.²/g., whereby chemical reaction between the siliconic acid and the surface of said silica is effected, and the proportion of methyl siliconic acid used being sufficient to provide from 2 to 5 methylsilyl groups per square millimicron of silica surface area, whereby a coated silica product which is both organophilic and hydrophilic is produced.

8. In a process for organophilizing solid, amorphous silica, the step comprising mixing, at a pH in the range of 7.0 to 10.7 and a temperature of 60 to 140° C., an aqueous dispersion of solid, amorphous silica, in a form having a surface area of from 1 to 900 m.²/g., and sodium methyl siliconate, whereby chemical reaction between the siliconate and the surface of said silica is effected, and the proportion of sodium methyl siliconate used being sufficient to provide from 2 to 5 methylsilyl groups per square millimicron of silica surface area, whereby a coated silica product which is both organophilic and hydrophilic is produced.

9. In a process for organophilizing solid, amorphous silica, the step comprising mixing, at a pH in the range of 7.0 to 10.7 and a temperature of 60 to 140° C., an aqueous dispersion of a solid, amorphous silica in a form having a surface area of from 1 to 900 m.²/g., and sodium vinyl siliconate, whereby chemical reaction between the siliconate and the surface of said silica is effected, and the proportion of sodium vinyl siliconate used being sufficient to provide from 1.3 to 3.2 monovinylsilyl groups per square millimicron of silica surface area, whereby a coated silica product which is both organophilic and hydrophilic is produced.

References Cited in the file of this patent
UNITED STATES PATENTS

| | | |
|---|---|---|
| 2,441,422 | Krieble | May 11, 1948 |
| 2,589,705 | Kistler | Mar. 18, 1952 |
| 2,610,167 | Te Grotenhuis | Sept. 9, 1952 |
| 2,645,588 | Barry | July 14, 1953 |
| 2,657,149 | Iler | Oct. 27, 1953 |
| 2,676,182 | Daudt et al. | Apr. 20, 1954 |
| 2,680,696 | Broge | June 8, 1954 |
| 2,705,206 | Wagner | Mar. 29, 1955 |
| 2,705,222 | Wagner | Mar. 29, 1955 |